United States Patent
Aten et al.

(10) Patent No.: US 10,533,520 B2
(45) Date of Patent: Jan. 14, 2020

(54) RADIALLY CONNECTED CASCADE GRIDS

(71) Applicant: Rohr, Inc., Chula Vista, CA (US)

(72) Inventors: Michael Ray Aten, San Diego, CA (US); Adam Stein, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 317 days.

(21) Appl. No.: 15/684,757

(22) Filed: Aug. 23, 2017

(65) Prior Publication Data

US 2018/0003129 A1   Jan. 4, 2018

Related U.S. Application Data

(63) Continuation of application No. 14/681,880, filed on Apr. 8, 2015, now Pat. No. 9,771,894, which is a continuation-in-part of application No. 14/047,224, filed on Oct. 7, 2013, now Pat. No. 9,347,398.

(51) Int. Cl.
*F02K 1/76* (2006.01)
*F02K 1/72* (2006.01)

(52) U.S. Cl.
CPC ............... *F02K 1/72* (2013.01); *F02K 1/763* (2013.01); *F05D 2230/50* (2013.01); *F05D 2240/40* (2013.01); *F05D 2260/30* (2013.01); *F05D 2260/941* (2013.01)

(58) Field of Classification Search
CPC .................................... F02K 1/76; F02K 1/763
See application file for complete search history.

(56) References Cited

U.S. PATENT DOCUMENTS

| | | | |
|---|---|---|---|
| 3,503,211 A | 3/1970 | Medawar | |
| 3,511,055 A | 5/1970 | Timms | |
| 3,814,324 A | 6/1974 | Wanger | |
| 4,145,877 A | 3/1979 | Montgomery | |
| 4,852,805 A | 8/1989 | Vermilye | |
| 5,040,730 A | 8/1991 | Hogie | |
| 5,313,788 A | 5/1994 | Wright | |
| 9,255,546 B2 | 2/2016 | Welch | |
| 9,347,398 B2 | 5/2016 | Aten | |
| 2003/0024236 A1* | 2/2003 | Lymons | F02K 1/72 60/226.2 |
| 2013/0200178 A1 | 8/2013 | Welch et al. | |
| 2013/0243589 A1 | 9/2013 | Caruel | |

(Continued)

FOREIGN PATENT DOCUMENTS

| | | |
|---|---|---|
| EP | 2138697 | 12/2009 |
| FR | 2960918 | 12/2011 |

OTHER PUBLICATIONS

Preinterview Office Action dated Oct. 5, 2015 in U.S. Appl. No. 14/047,224.

(Continued)

*Primary Examiner* — Gerald L Sung
(74) *Attorney, Agent, or Firm* — Snell & Wilmer, L.L.P.

(57) ABSTRACT

In various embodiments, a cascade array may comprise an actuator, a first cascade having a first integral flange, and a second cascade having a second integral flange, wherein the first cascade and the second cascade are operatively coupled to one another via the first integral flange and the second integral flange to form a cascade assembly, and the actuator is disposed between the first cascade and the second cascade.

8 Claims, 4 Drawing Sheets

(56) References Cited

U.S. PATENT DOCUMENTS

2013/0266423 A1* 10/2013 Vauchel .................. F02K 1/72
 415/148
2015/0097055 A1   4/2015 Aten
2015/0354500 A1  12/2015 Caruel

OTHER PUBLICATIONS

Notice of Allowance dated Feb. 1, 2016 in U.S. Appl. No. 14/047,224.
Extended European Search Report dated Mar. 5, 2015 in European Application No. 14187863.7.
Non-Final Office Action dated Dec. 30, 2016 in U.S. Appl. No. 14/681,880.
Notice of Allowance dated May 25, 2017 in U.S. Appl. No. 14/681,880.

* cited by examiner

RADIALLY CONNECTED CASCADE GRIDS

CROSS-REFERENCE TO RELATED APPLICATIONS

This application is a continuation of U.S. Non-Provisional patent application Ser. No. 14/681,880, entitled "RADIALLY CONNECTED CASCADE GRIDS," filed on Apr. 8, 2015, which is a continuation-in-part of, and claims priority to, and the benefit of U.S. Non-Provisional patent application Ser. No. 14/047,224, entitled "ACTUATOR SUPPORT SYSTEM AND APPARATUS," filed on Oct. 7, 2013, the disclosures of which are hereby incorporated by reference in their entirety.

FIELD

The present disclosure relates to cascade-type thrust reverser systems and, more specifically, to the structural engineering of such cascade grids.

BACKGROUND

Aircraft engines on a commercial airliner typically include a thrust reverser as part of the nacelle system. The thrust reverser system may be configured to provide reverse thrust to slow the aircraft, for example during a landing event after touchdown. One type of thrust reverser design includes cascades which help redirect the air from the fan duct in a reverse thrust direction during thrust reverser operation. The structural support for such cascades may have an impact on the external profile and/or aerodynamic features of an aircraft, possibly reducing the overall efficiency of the aircraft in flight.

SUMMARY

In various embodiments, a thrust reverser system may comprise a first cascade, a second cascade, an actuator, and a structural connecting member. The actuator may be radially disposed between the first cascade and the second cascade. The structural connecting member may be adjacent the actuator. The structural connecting member may be configured to structurally join the first cascade and the second cascade.

In various embodiments, a cascade array may comprise an actuator, a first cascade and a second cascade. The first cascade may have a first integral flange. The second cascade may have a second integral flange. The first cascade and the second cascade may be operatively coupled to one another via the first integral flange and the second integral flange to form a cascade assembly. The actuator may be disposed between the first cascade and the second cascade.

In various embodiments, a thrust reverser system may comprise a first cascade, a second cascade and a first actuator. The first cascade may include a first flange. The second cascade may include a second flange. The first actuator may comprise a body. The body may include a third flange and a fourth flange. The first cascade may be operatively coupled to the first actuator by the first flange and the third flange. The second cascade may be operatively coupled to the first actuator by the second flange and the fourth flange.

In various embodiments, a propulsion system may comprise a translating sleeve, a plurality of cascades, a plurality of actuators, a first track beam and a second track beam. Each cascade of the plurality of cascades may comprise a first flange and a second flange. Each of the actuators of the plurality of actuators may comprise a third flange and a forth flange. The first track beam may comprise a fifth flange. The second track beam may comprise a sixth flange. A first cascade of the plurality of cascade may be coupled to a first actuator of the plurality of actuators via the first flange and the third flange. The first cascade may be coupled to the first track beam via the second flange and the fifth flange.

In various embodiments, a cascade assembly may comprise a first cascade, a second cascade and a first actuator. The first cascade may include a first flange and a second flange. The second cascade may include a third flange and a fourth flange. The first actuator may comprise a body, which may include a fifth flange and a sixth flange. The first cascade may be coupled to the second cascade through the body of the first actuator via the first flange being coupled to the firth flange and the third flange being coupled to the sixth flange.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1:
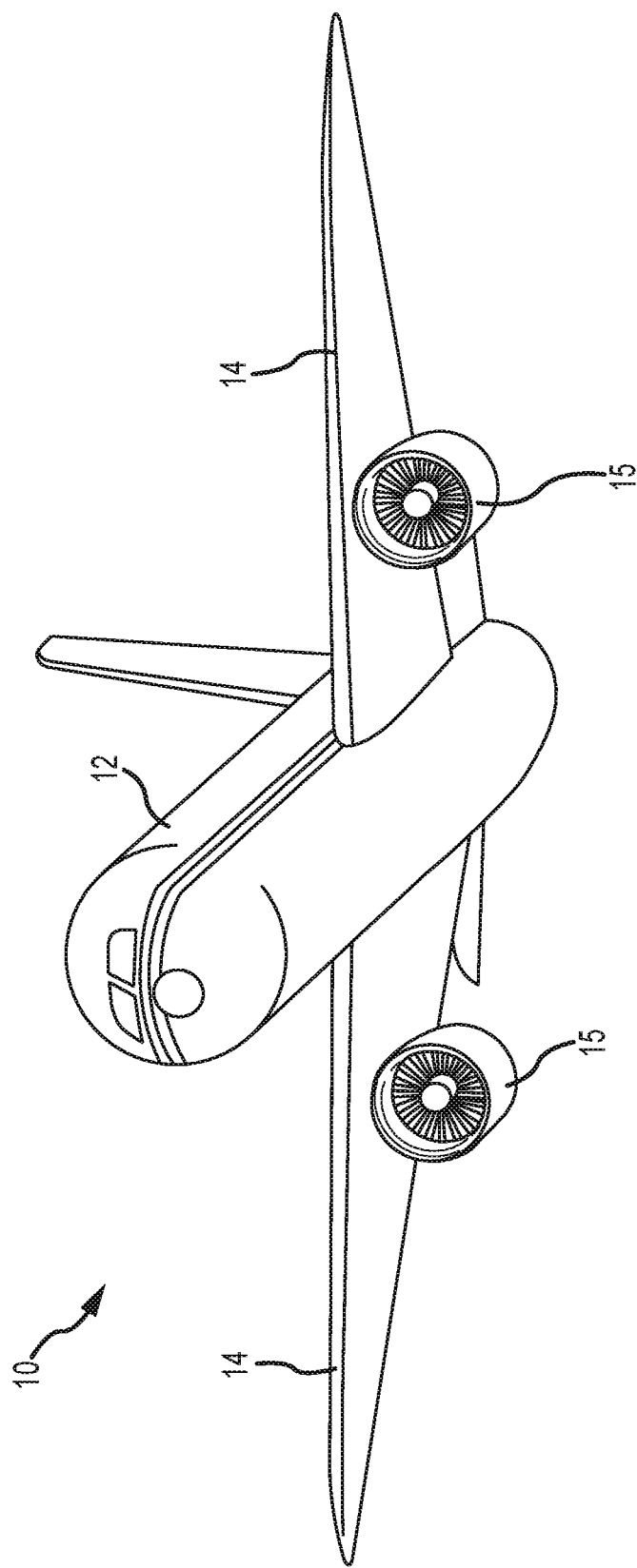
FIG. 1 illustrates a perspective view of an aircraft, in accordance with various embodiments.

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Furthermore, any reference to singular includes plural embodiments, and any reference to more than one component or step may include a singular embodiment or step. Surface shading lines may be used throughout the figures to denote different parts, but not necessarily to denote the same or different materials.

As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion.

In various embodiments, a cascade array of a thrust reverser may comprise a number of individual cascades, also sometimes called cascade grids or cascade boxes such as, for example, eight cascades per side for a total of 16 cascades per thrust reverser. The thrust reverser system may also comprise two or three actuators per side, for a total of four or six per thrust reverser. These actuators may be located between two of the cascade boxes.

In various embodiments, each cascade may comprise integral flanges at their forward and aft ends that are used to structurally attach the cascade to the thrust reverser structure. The forward flanges of the cascades may be attached to forward thrust reverser fixed structure such as, for example, a torque box. The aft flanges of the cascade may be attached to a frame, such as, for example, an aft cascade ring. During reverse thrust operation, air rushes through the cascades in great volumes and at great speeds. The aerodynamic features of the cascades help turn this airflow in the desired direction for reverse thrust. The work that the cascades do on the airflow to turn it results in loads being generated in the cascades, which must be transferred back into the thrust reverser structure and ultimately to the aircraft. The torque box may be configured to take or support the fore-aft, radial, and hoop loads from the cascades. The aft cascade ring may be designed and/or configured to take or support hoop and radial loads. However, the aft cascade ring and the thrust reverser system as a whole may be designed to limit or minimize any fore-aft loads that are applied to the aft cascade ring. The loads are typically all taken by the torque box. The loads on the aft cascade ring generally impact its overall size and shape and positioning. Because of the limited space available in the area where the aft cascade ring is positioned in the thrust reverser (typically between the inner and outer panel of the translating sleeve when the thrust reverser is stowed), it can be difficult to fit an aft cascade ring that is the right size and shape to take the required loads. The space claim for the aft cascade ring structure sometimes drives the need to expand the outer shape of the thrust reverser radially outward to accommodate it.

If adjacent cascade boxes can be radially attached to one another, a hoop load path is established that can allow the aft cascade ring to be advantageously reduced in size. But, in some cases part of the thrust reverser actuator assembly is positioned between adjacent cascade boxes making it difficult to structurally attach them together in the radial direction.

With reference to FIG. 1, an aircraft 10 may comprise a fuselage 12 and a pair of wings 14. Aircraft 10 may further comprise a propulsion system 15 (e.g., a gas turbine engine-nacelle assembly). Propulsion system 15 may be mounted to the undersides of wings 14. Propulsion system 15 may comprise a fan and an engine core. Moreover, the engine core is configured to drive a fan to create forward thrust and/or propulsion for aircraft 10. The engine core and fan are typically enclosed and/or housed in a nacelle. The nacelle may comprise a thrust reverser system.

Figure 2B:
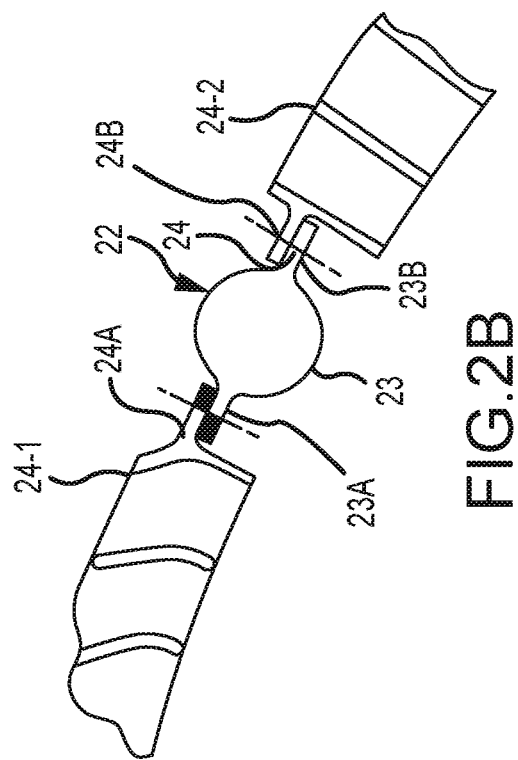
FIG. 2B illustrates a perspective view of cascade support structure, in accordance with various embodiments.
Figure 2A:
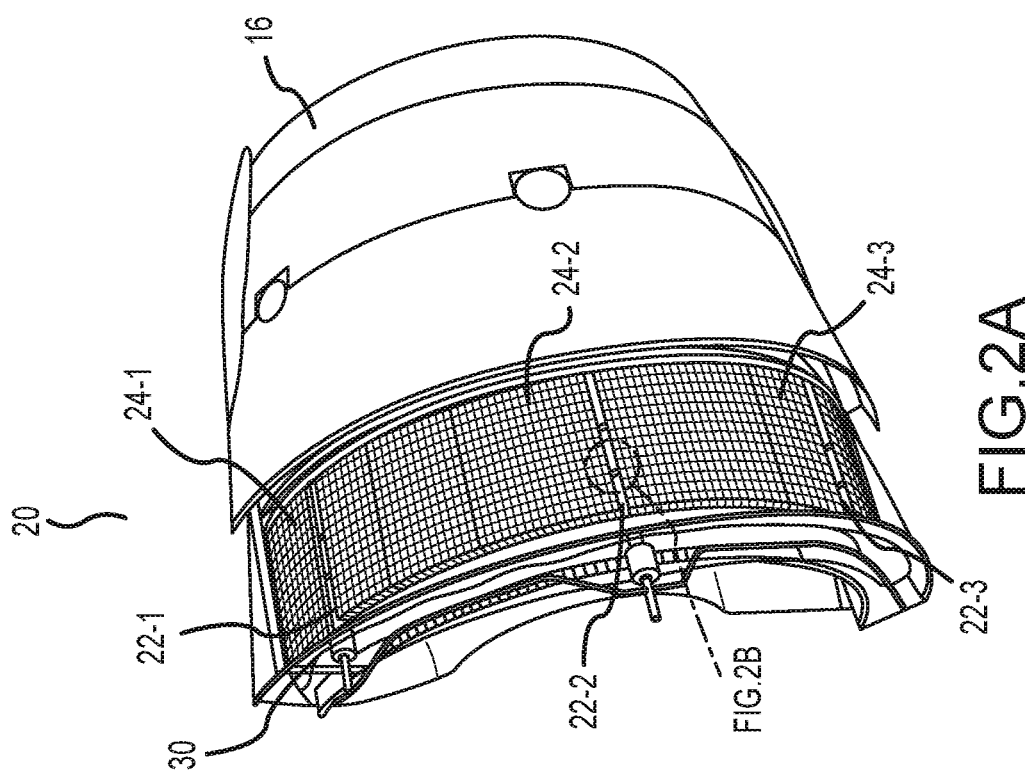
FIG. 2A illustrates a perspective view of a portion of a thrust reverser system, in accordance with various embodiments.

In various embodiments, and with reference to FIGS. 2A and 2B, thrust reverser system 20 may be a cascade-style thrust reverser system. Thrust reverser system 20 may comprise a translating sleeve 16, one or more actuators 22 (shown as 22-1, 22-2 and 22-3 in FIG. 2A), and one or more cascades 24 (shown as 24-1, 24-2 and 24-3 in FIG. 2A). Actuators 22 may comprise a first end and a second end. The first end may be coupled to a torque box 30. The second end may be coupled to translating sleeve 16. In this regard, the first end of actuator 22 is fixed to torque box 30 and the second end of actuator 22 is configured to translate forward and aft with translating sleeve 16. In operation, actuators 22 may be extended to translate translating sleeve 16 aft to deploy and activate thrust reverser system 20. Likewise, actuators 22 may retracted to translate translating sleeve 16 forward to return the thrust reverser system 20 to a stowed an inactive condition.

Figure 3B:
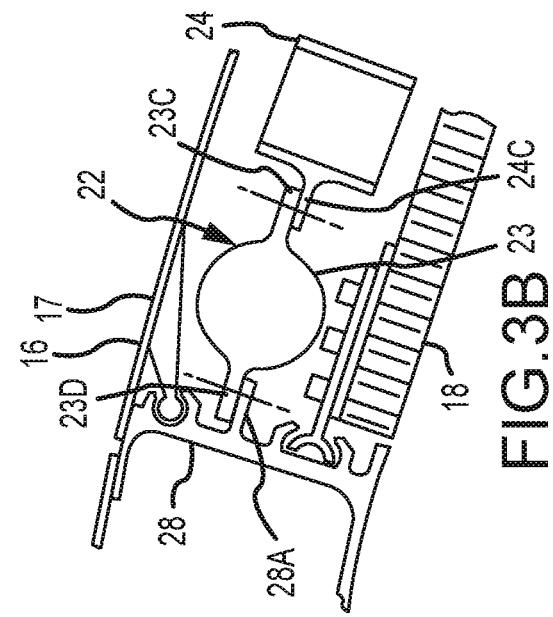
FIG. 3B illustrates a perspective view of cascade support structure, in accordance with various embodiments.

In various embodiments, and with momentary reference to FIG. 3B, these cascades may be housed between inner and outer panels of translating sleeve 16. Translating sleeve 16 may comprise an outer panel 17 and an inner panel 18. Outer panel 17 and inner panel 18 may be join together and may define a channel. When translating sleeve 16 is in a stowed (e.g., a forward position), cascades 24 may be housed within translating sleeve 16 in the channel defined by outer panel 17 and inner panel 18.

With reference to FIGS. 2A-2B, one example is shown of how to structurally connect adjacent cascade boxes 24 in a radial direction while taking into account the presence of an actuator 22. A structural connecting member is positioned or created between the adjacent cascade boxes which to transfer at least hoop loads and racking loads between them, while also allowing space for the actuator to remain in this space. In one example, actuator 22 may comprise a body or outer shell or housing 23, which may in turn comprise one or more actuator flanges (e.g., actuator flanges 23A and 23B). Actuator flanges 23A and 23B may be an assembly that attaches to outer shell 23 or may be integrally formed as a portion of outer shell 23. Cascades 24 may also comprise one of more cascade flanges (e.g., cascade flanges 24A and 24B). Cascade flanges 24A and 24B may be an assembly that attaches to cascade 24 or may be integrally formed as a portion of cascade 24. Actuator flanges 23A and 23B may be configured to couple to and support cascade flanges 24A and 24B. In this regard, one or more cascades 24 may be joined and/or supported by one or more actuators 22 at actuator flanges 23A and 23B and cascade flanges 24A and 24B. The connection between the flanges (e.g., actuator flanges 23A and 23B and cascade flanges 24A and 24B) may be secured by any suitable fastener, bond, connector, and/or the like. Structurally, loads on cascade box 24-1 may be transferred to cascade flange 24A, and in turn to actuator flange 23A and outer shell 23, and then to actuator flange 23B, and in turn to cascade flange 24B and cascade box 24-2. These actuator and cascade flanges may run the entire length of the actuators and cascades, or they may be discreet flanges, for example a flange at the forward end and a flange at the aft end may be provided which several discreet flanges in between, according to the particular application and the need.

Figure 3A:
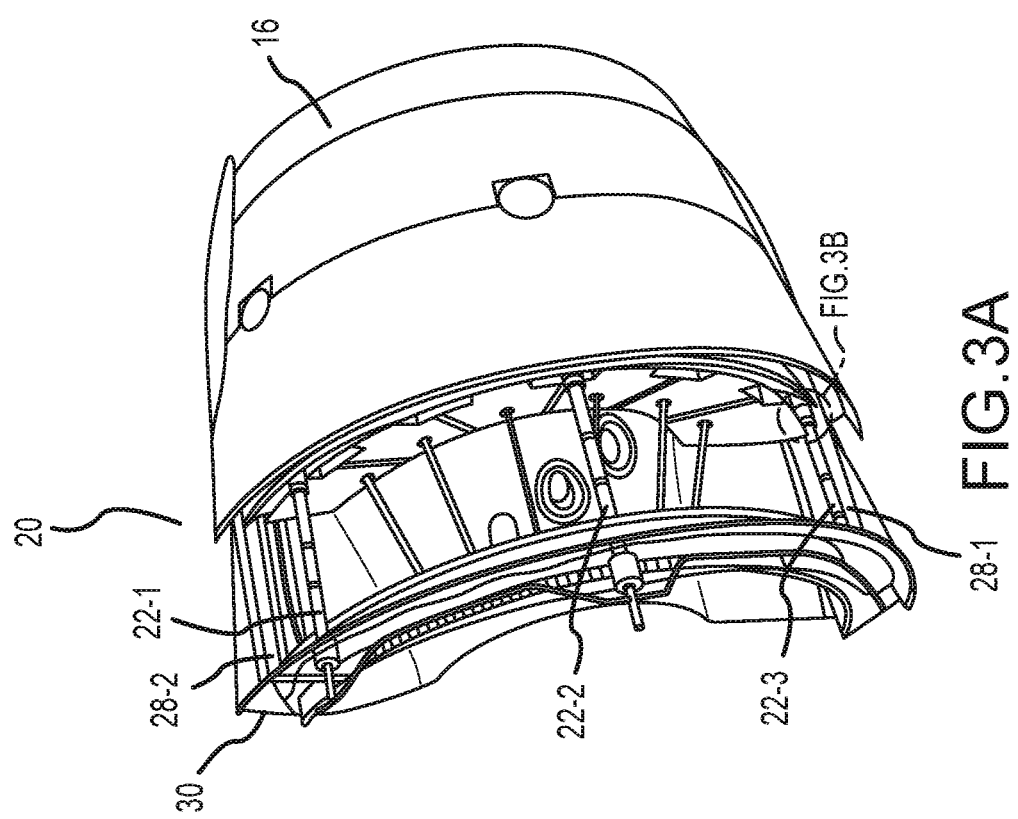
FIG. 3A illustrates a perspective view of a portion of a thrust reverser system, in accordance with various embodiments.

With reference to FIGS. 3A and 3B, one method is illustrated of establishing a radial connection between the top or bottom cascade box 24 on a thrust reverser half and the adjacent track beam (also sometimes called a hinge or latch beam). Thrust reverser system 20 may include one or more track beams 28 (e.g., track beams 28-1 and 28-2 as shown in FIG. 3A) extending forward to aft. Actuator 22 may also be configured to mount to track beam 28 and cascade 24. Body 23 may comprise one or more actuator flanges (e.g., actuator flanges 23C and 23D). Track beam 28 may comprise one or more track beam flanges (e.g., track beam flange 28A). Cascade 24 may comprise one or more cascade flanges (e.g., cascade flange 24C). Track beam flange 28A may be configured to couple to and/or be joined to actuator flange 23D. Cascade flange 24C may be configured to couple to and/or be joined to actuator flange 23C. In this regard, outer shell 23 may support and/or couple cascade 24 to track beam 28. As discussed herein, the connection between the flanges (e.g., track beam flanges 28A and actuator flange 23D) may be secured by any suitable fastener, bond, connector, and/or the like. Similar to the previous description, this structural attachment of a cascade box to the track beam allows for the transfer of at least racking and hoop loads through the flanges and the outer shells of the actuators. When used in combination, the two methods in FIGS. 2B and 3B create an array of cascade boxes 24 that are capable of transferring their hoop loads through one another to either of the track beams 28-1 or 28-2. Because the cascade boxes have more internal load carrying capability, the size of the aft cascade ring may be reduced due to its reduced requirement for support.

Figure 4A:
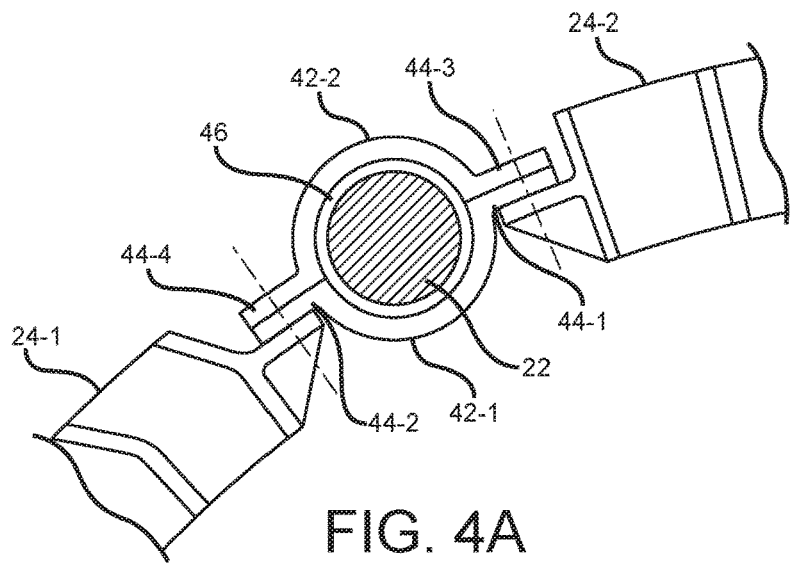
FIG. 4A illustrates a perspective cross-sectional view of a first cascade support, in accordance with various embodiments.
Figure 4B:
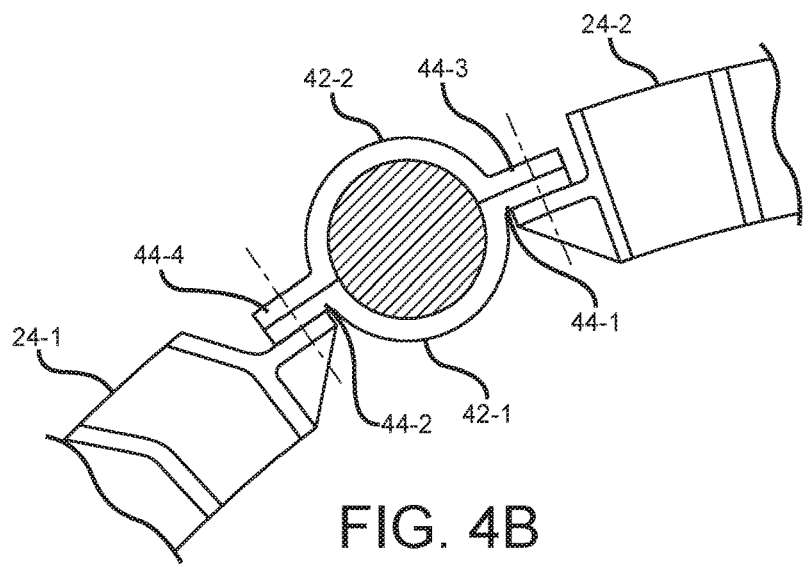
FIG. 4B illustrates a perspective cross-sectional view of a second cascade support, in accordance with various embodiments.

With reference to FIGS. 4A-4B, other examples of structural connecting members and methods between adjacent cascade boxes 24 are illustrated. As shown in FIG. 4A, actuator 22 may be surrounded by a two piece clamp. The two piece clamp may comprise a first clamp half 42-1 and a second clamp half 42-2. First clamp half 42-1 may comprise a first flange 44-1 and a second flange 44-2. Similarly, second clamp half 42-2 may comprise a third flange 44-3 and a fourth flange 44-4. These flanges (e.g., first flange 44-1, second flange 44-2, third flange 44-3, and/or fourth flange 44-4) may be configured to operatively couple to and/or engage cascade 24-1 and/or cascade 24-2.

First clamp half 42-1 and second clamp half 42-2 may surround actuator 22 but may not clamp to actuator 22 or even contact (in normal operation) outer shell 23. In this regard, the two piece clamp does not engage and/or load actuator 22. Rather, actuator 22 is separated from first clamp half 42-1 and second clamp half 42-2 by a gap 46. Gap 46 may be any suitable size to minimize and/or eliminate contact between actuator 22 and the two piece clamp. In this arrangement, actuator 22 may float when the thrust reverser is deployed. This arrangement allows actuator 22 to take fore-aft load only when the thrust reverser is deployed and avoid potentially damaging or life-limiting side loads. This arrangement also defines a load path between first cascade 24-1 and second cascade 24-2 and through first clamp half 42-1 (i.e., through first flange 44-1, and/or second flange 44-2) and second clamp half 42-2 (i.e. through third flange 44-3, and/or fourth flange 44-4) to bear and/or distribute the hoop loads and radial loads across the cascade array. In this regard, the hoop loads and radial loads are isolated from the actuator, while allowing the actuator to remain in its position circumferentially spaced from and between each of the cascade boxes 24-1 and 24-2.

In various embodiments and with particular reference to FIG. 4B, actuator 22 may be clamped by first clamp half 42-1 and second clamp half 42-2. In this arrangement, actuator 22 may bear and translate radial, hoop and fore-aft loads through first clamp half 42-1 (i.e., through first flange 44-1, and/or second flange 44-2) and second clamp half 42-2 (i.e. through third flange 44-3, and/or fourth flange 44-4). This arrangement may cause the size and/or materials used to make actuator 22 and/or the body of actuator 22 to be designed to bear the loads applied to actuator 22.

Figure 5:
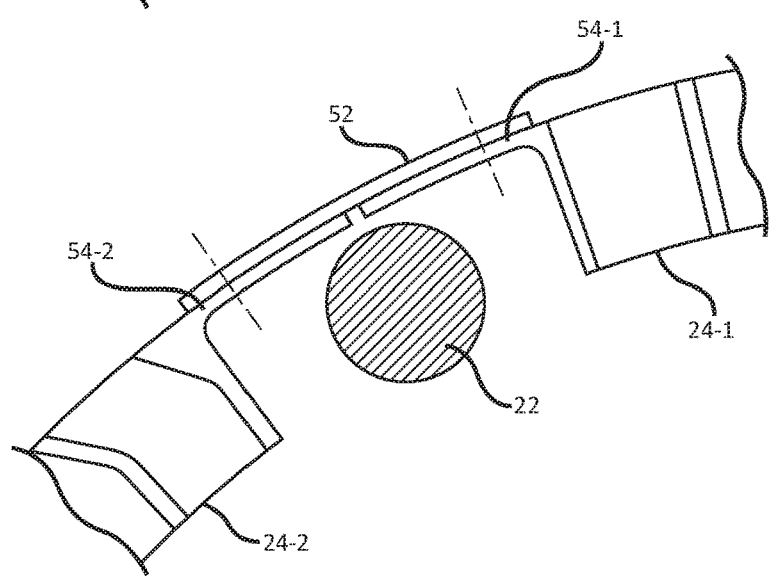
FIG. 5 illustrates a perspective cross-sectional view of a splice plate cascade support, in accordance with various embodiments.

In various embodiments and with reference to FIG. 5, first cascade 24-1 and second cascade 24-2 may comprise a first integral flange 54-1 and a second integral flange 54-2, respectively. First integral flange 54-1 and second integral flange 54-2 may be coupled to one another with a splice plate 52. First integral flange 54-1 and second integral flange 54-2 may be configured to pass by and at least partially surround actuator 22. In this regard, first integral flange 54-1 and second integral flange 54-2 may create a load path between first cascade 24-1 and second cascade 24-2, which may isolate actuator 22 from the hoop and radial loads that pass through the cascades, while allowing the actuator to remain in its position circumferentially spaced from and between each of the cascade boxes 24-1 and 24-2.

In various embodiments, typical cascade-style thrust reverser systems comprise an aft cascade ring. This aft cascade ring generally couples a plurality of cascades to one another over the radius of the cascade assembly at the aft end of the cascade assembly. The aft cascade ring may be configured to support the hoop defined by the cascade assembly. In various embodiments, this aft cascade ring may impose design limitations on the outer and/or overall envelope of the nacelle surface including, for example, the translating sleeve. In various embodiments, creating a load and support path with between actuators 22, cascades 24, and track beams 28 may allow the aft cascade ring to be minimized and/or removed from the thrust reverser system 20. Moreover, in various embodiments, actuator 22 may be capable of operating with a side load applied.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

We claim:

1. A cascade array, comprising: an actuator; a first cascade having a first integral flange; a second cascade having a second integral flange; and a splice plate; wherein the first cascade and the second cascade are operatively coupled to one another via the first integral flange and the second integral flange to form a cascade assembly, the actuator is disposed between the first cascade and the second cascade, and the first integral flange and the second integral flange extend towards one another and extend past at least a portion of the actuator.

2. The cascade array of claim 1, wherein the cascade assembly is configured to at least partially surround the actuator.

3. The cascade array of claim 1, wherein the cascade assembly is configured to isolate the actuator from radial loads and hoop loads.

4. The cascade array of claim 1, wherein the splice plate is configured to operatively couple the first cascade and the second cascade together to form the cascade assembly.

5. The cascade array of claim 1, wherein the cascade assembly is housed with a translating sleeve when a thrust reverser system is in the stowed position.

6. The cascade array of claim 1, wherein the cascade assembly is operatively coupled to a torque box.

7. The cascade array of claim 4, wherein the splice plate is disposed radially outward from the first integral flange and the second integral flange.

8. The cascade array of claim 7, wherein a radially inner surface of the splice plate is coupled to a radially outer surface of the first integral flange and a radially outer surface of the second integral flange.

* * * * *